UNITED STATES PATENT OFFICE.

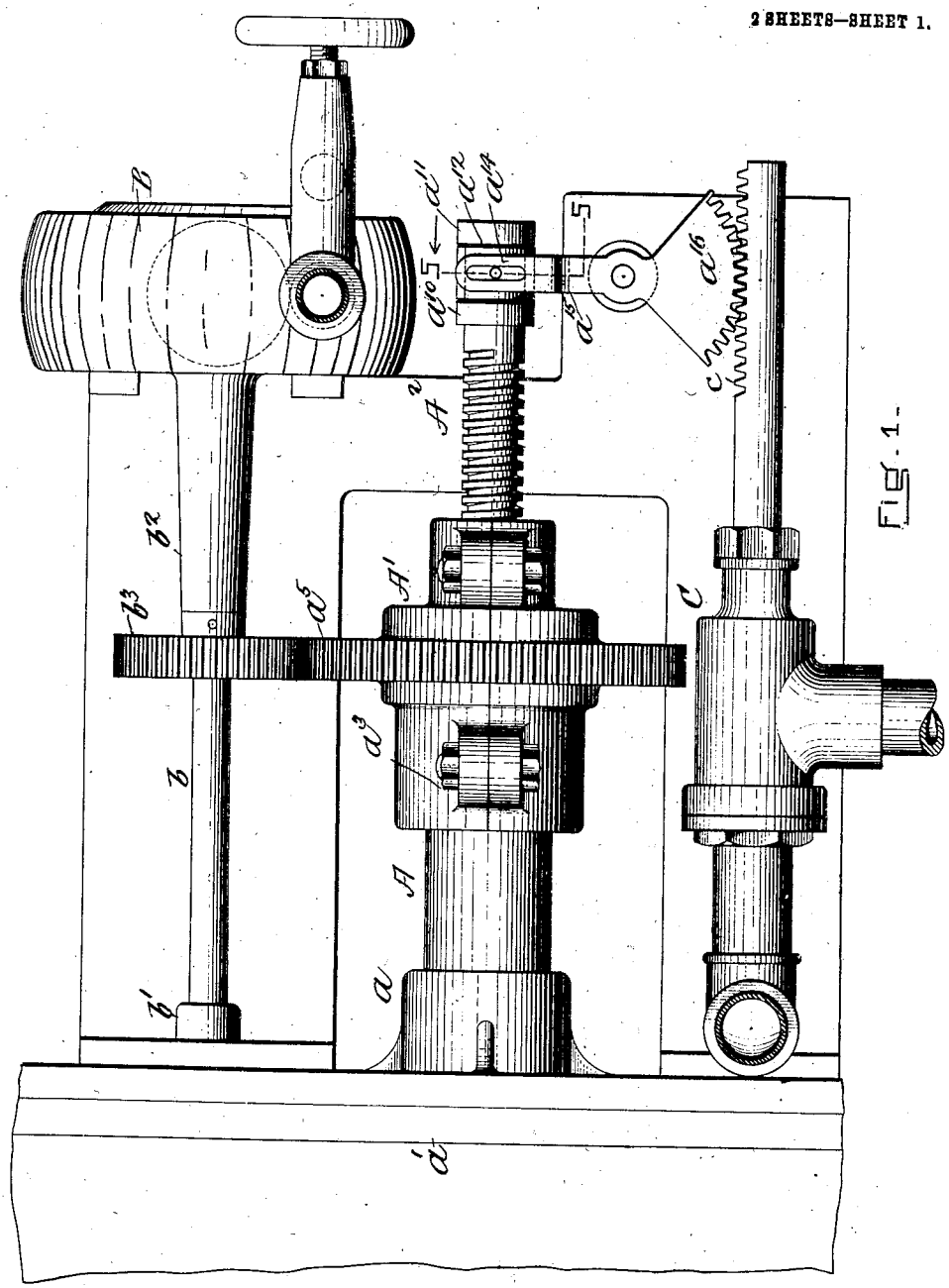

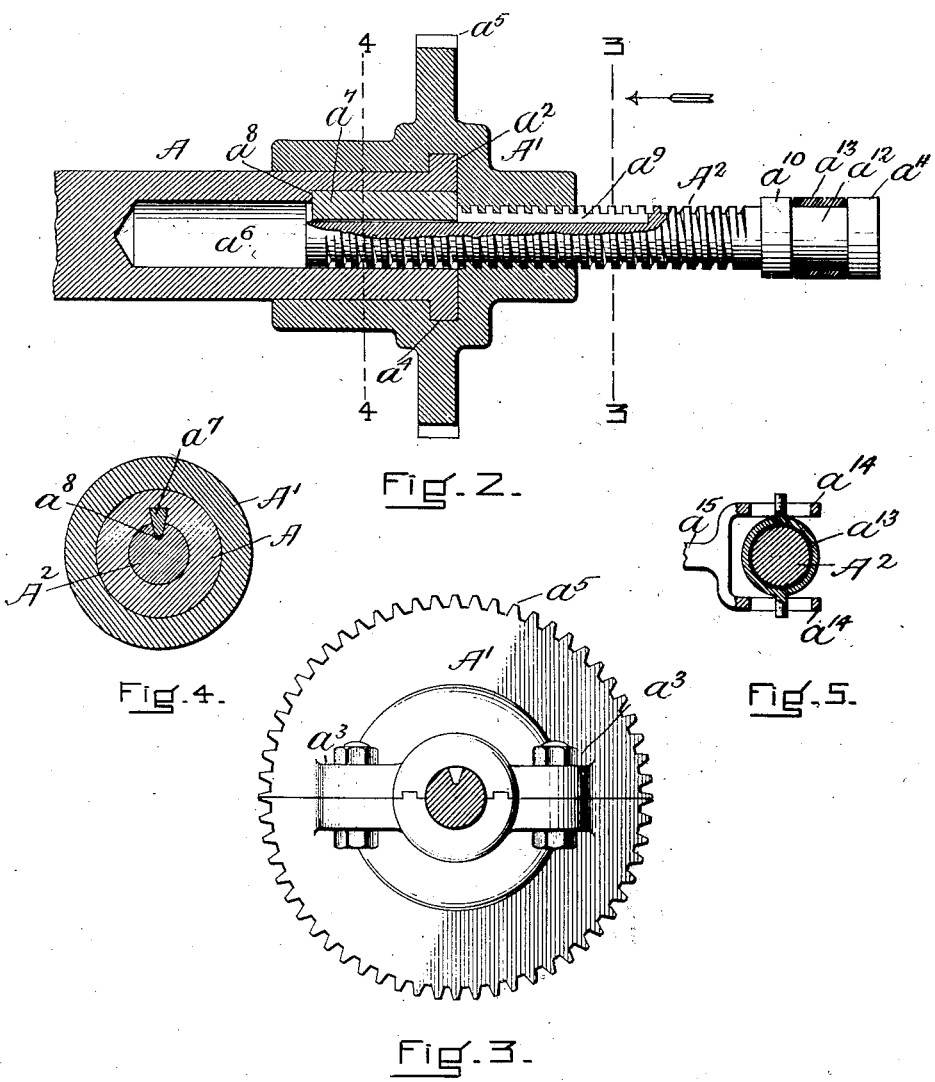

HENNING G. SAHLIN, OF MALDEN, MASSACHUSETTS, ASSIGNOR OF FORTY-FIVE ONE-HUNDREDTHS TO DAVID RICE, OF BOSTON, MASSACHUSETTS.

SPEED-GOVERNOR.

967,443.  Specification of Letters Patent.  Patented Aug. 16, 1910.

Application filed January 7, 1908. Serial No. 409,615.

*To all whom it may concern:*

Be it known that I, HENNING G. SAHLIN, of Malden, in the county of Middlesex and State of Massachusetts, a citizen of the United States, have invented a new and useful Improvement in Speed-Governors, of which the following is a full, clear, and exact description, reference being had to the accompanying drawings, forming a part of this specification, in explaining its nature.

My invention relates to an improved form of governor especially adapted for regulating the speed of turbine engines.

The improved governor is of that class which employs an engine or motor auxiliary to the machine or part to be governed and capable of being run at a regular or determinate speed. Governors of this class have a recognized status to those skilled in the art of speed governors and it will be unnecessary to refer to the general operation of governors of this kind; accordingly the following description will be limited to the mechanical structure and operation of the improved governor which I have made.

The object of my invention is to provide a governor of as simple construction as possible and one which can easily be applied to or combined with a turbine or other part to be governed.

My invention can best be seen and understood by reference to the drawings in which—

Figure 1 is a plan of the governor and connecting parts. Fig. 2 shows mainly a cross vertical section of the governor. Fig. 3 is an end elevation taken from the sectional line 3—3 of Fig. 2. Fig. 4 is a section on line 4—4 of Fig. 1, and Fig. 5 is a section on line 5—5 of Fig. 1.

In the drawings:—A represents what I will term a power shaft inasmuch as it is the shaft operated by the mechanism or part to be governed. This shaft in practice may be either the main shaft of the part governed or other shaft operated thereby. I prefer that it shall be the main shaft inasmuch as my improved form of governor is especially adapted to be arranged upon the end of the main shaft of any engine, turbine or other motor. The shaft A is shown having a bearing $a$ attached to a fixture $a^1$. Upon the end of the power shaft A is an annular flange $a^2$. This flange may be an auxiliary part affixed to the end of the power shaft although I prefer it to be, as shown, a part integral therewith. Arranged to turn freely upon the power shaft is what may be termed a nut or bearing $A^1$ formed in two parts which are held together by fastenings $a^3$ by which the two parts of the nut may be fastened together to fit over the annular flange $a^2$ on the power shaft. The nut is provided with an interior annular recess or incision $a^4$ in which the annular flange $a^2$ is adapted to fit and the flange acts, accordingly, to hold the nut against a longitudinal movement with respect to the power shaft, but admits of its turning freely thereon.

The nut $A^1$ is adapted to be rotated at a regular or determinate speed and for this purpose I prefer to employ a water motor (not shown) contained within a casing B.

$b$ represents the shaft of the water motor revolving in bearings $b^1$, $b^2$ of which the bearing $b^1$ is shown secured to the fixture $a^1$ and the bearing $b^2$ to the side of the motor casing. I prefer that there should be a connection by positive gear between the nut $A^1$ and governor shaft $b$ in order that there may be regularity in operation and the elimination of loss by slippage. Accordingly there are formed upon the periphery of the nut $A^1$ teeth $a^5$ forming as it were a geared wheel intermeshing with a gear $b^3$ carried by the governor shaft.

The nut $A^1$ is adapted in part to extend forward from the end of the power shaft, which part of the nut is internally threaded to embrace a screw or governor member $A^2$ which passes through this forward-extending portion of the nut and extends into a chamber $a^6$ formed within the power shaft. Extending from the internal wall of the power chamber $a^6$ therein is a shaft forming the chamber $a^6$ therein is a shaft forming feather $a^7$ which is fastened to the power shaft in any suitable manner and preferably by being keyed into a wedge-shaped way $a^8$ formed therein (see Fig. 4.) This feather projects to fit within a longitudinal slot $a^9$ formed in the screw $A^2$.

Upon the end of the screw $A^2$ are formed flanges $a^{10}$, $a^{11}$ forming with that portion of the shaft contained between them a circumferential groove $a^{12}$, in which runs an annular collar $a^{13}$. Secured to this collar are the forked ends $a^{14}$ of a lever $a^{15}$. The other end of the lever opposite the forked ends thereof is provided with a supplemental gear $a^{16}$ intermeshing with a rack $c$ which is connected to operate a controlling valve (not shown) contained within a pipe fixture C.

Referring now to the operation of the device: It will be observed that upon the rotation of the power shaft A the screw or governor member $A^2$ will be rotated through the instrumentality of the connecting feather $a^8$ at the same speed as that at which the shaft is turning. At the same time the power shaft is turning the nut or bearing $A^1$ will be also turning at a constant or determinate speed. If the speed of the nut and power shaft is the same then the screw or governor member $A^2$ will maintain a constant position. Upon the occurrence of a difference in speed, however, between the power shaft and rotary nut or bearing $A^1$ the power shaft will act to turn the screw $A^2$ in the nut or bearing $A^1$ fixed on the end of the shaft against any but a rotary movement, thereby forcing the screw or governor member longitudinally inwardly or outwardly depending on whether the shaft is rotated at a less or greater speed than the speed of the nut. During this movement the screw will move along the feather $a^7$ by reason of the slot $a^9$ in the screw. As the screw or governor member is moved longitudinally its motion is imparted to operate the speed-controlling valve through the mechanism of the lever $a^{15}$ operating the segmental gear $a^{16}$ intermeshing with the rack $c$ connecting with the controlling valve, the rack $c$ being moved in one direction or the other for controlling the valve depending as the lever is thrown to the right or left by the motion of the screw.

Having thus fully described my invention, I claim and desire to secure by Letters Patent of the United States:—

1. A governor of the character specified having a shaft driven by the part to be governed, said shaft being chambered at one end to receive a screw, said screw being connected to said shaft to rotate therewith and movable into and out from the chamber in said shaft, a nut mounted upon said shaft and rotatable with relation thereto, said nut engaging said screw, and means to rotate said nut at a predetermined and regular rate of speed.

2. A governor of the character specified having a shaft driven by the part to be governed, said shaft being chambered at one end and carrying a nut, a screw fitting said nut, and means comprising a second shaft having a predetermined speed, and gears connecting said shafts whereby said screw and said nut will be rotated as described.

3. A governor of the character specified having a shaft driven by the part to be governed, a governor member driven by said shaft and movable longitudinally with respect thereto, a rotatable nut on said shaft fixed against any but a rotary movement and adapted to be rotated at a constant or determinate speed, said nut having threaded engagement with said governor member, and means whereby said shaft may move said governor member for operating a controlling mechanism upon the occurrence of a difference in the speed of said shaft and nut.

HENNING G. SAHLIN.

Witnesses:
JOHN E. R. HAYES,
M. E. FLAHERTY.